United States Patent Office 3,427,073
Patented Feb. 11, 1969

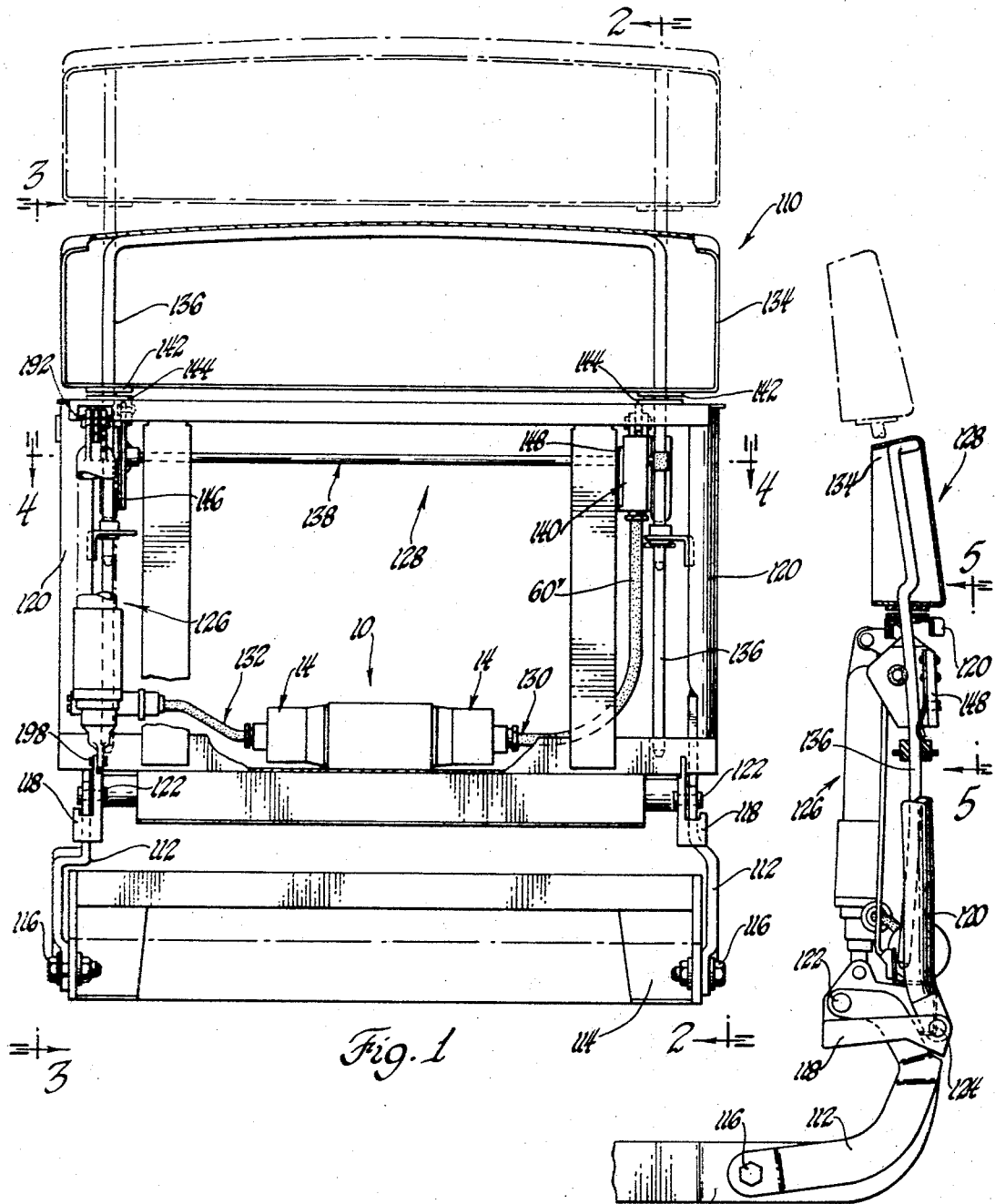

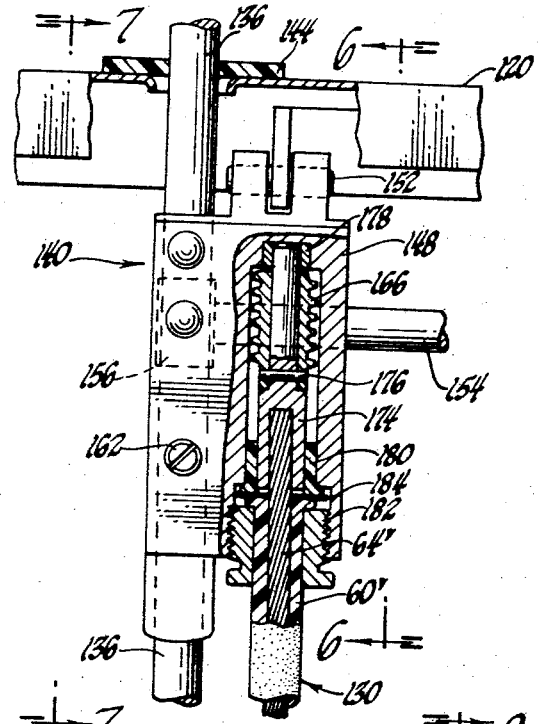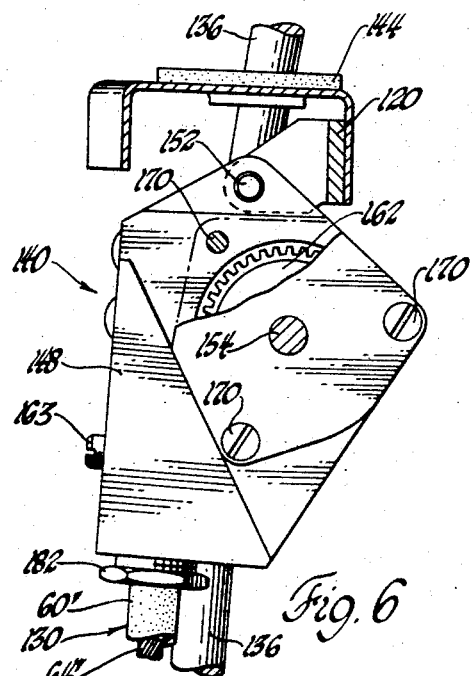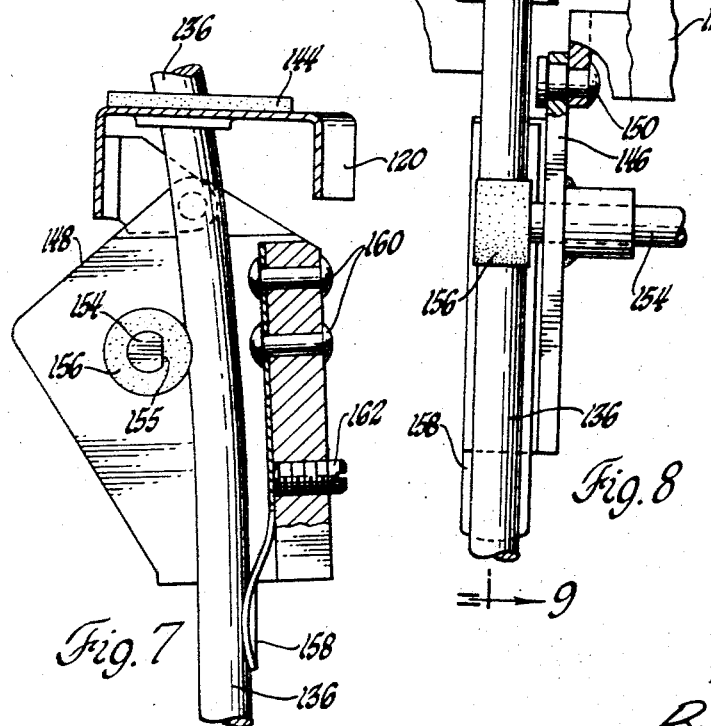

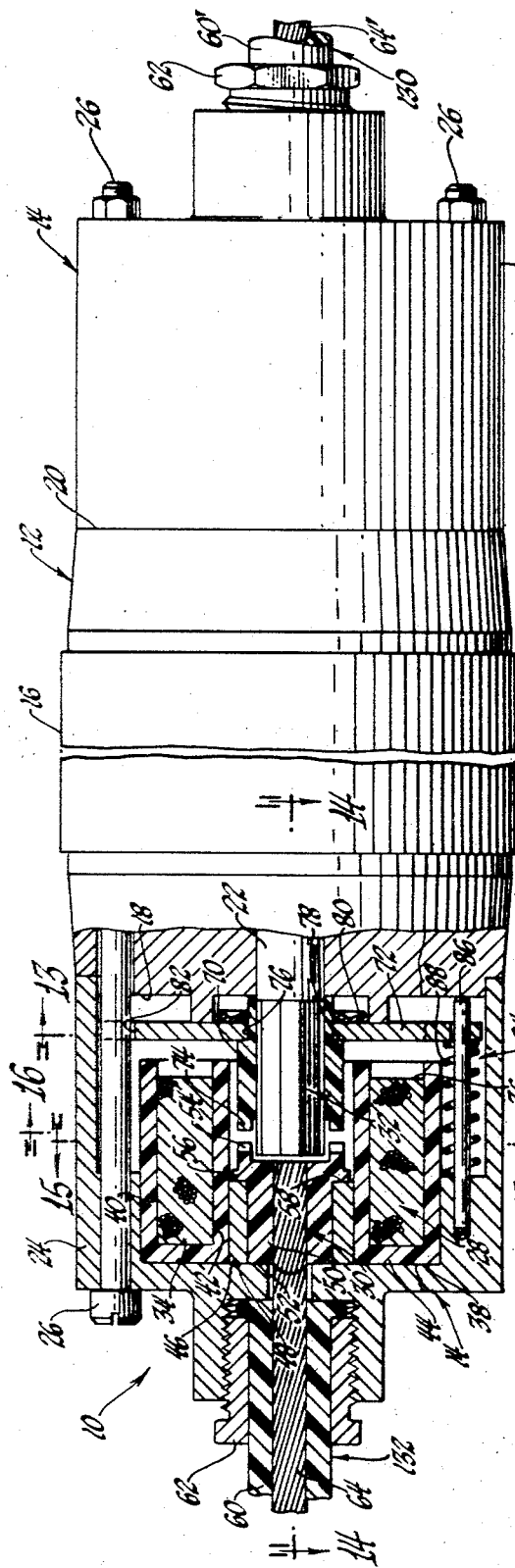

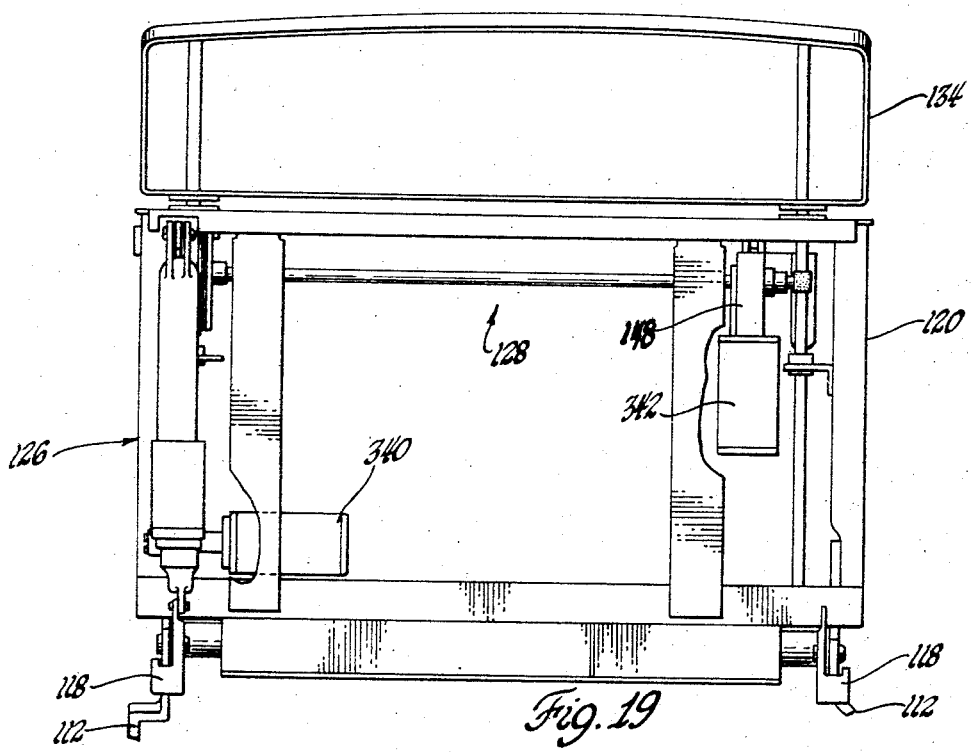
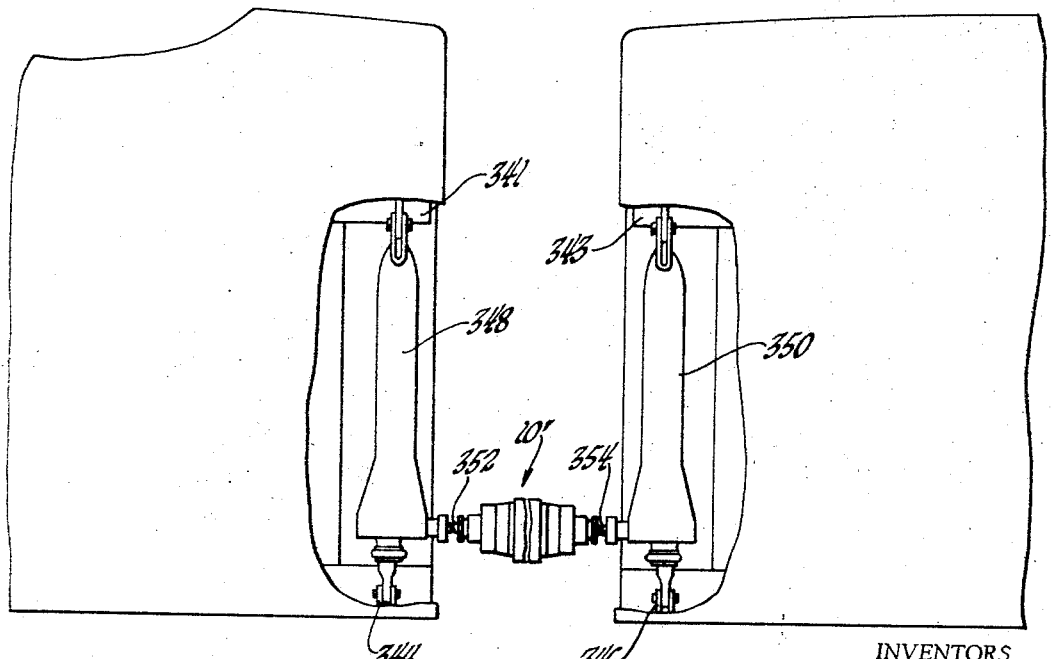

3,427,073
SEAT ASSEMBLY
William T. Downs, Detroit, and Robert I. Homier, Farmington, Mich., assignors, by mesne assignments, to Lear Siegler, Inc., Santa Monica, Calif., a corporation of Delaware
Filed Oct. 22, 1965, Ser. No. 500,510
U.S. Cl. 297—361                    19 Claims
Int. Cl. A47c 1/024, 1/036

ABSTRACT OF THE DISCLOSURE

A seat assembly comprising, a seat frame, a back frame connected to the seat frame for pivotal movement relative thereto; an adjustable head-rest assembly attached to said back frame for moving relative to said back frame, and motor means for actuating the selectively and independent movements of the back frame and the head rest.

---

This invention relates to a seat assembly of the type including a seat frame with a back frame operatively connected to the seat frame for pivotal movement relative thereto and, more specifically, to such a seat assembly including a positioning means operatively interconnecting the back frame and the seat frame for pivoting the back frame between an upright position and various reclined positions, a headrest operatively attached to the back frame for movement relative to the back frame, motor means selectively operable for producing rotary movement and including first and second clutching means attached to respective ends of the motor means for selectively and independently transmitting rotary movement for moving the headrest and the positioning means respectively.

Seat assemblies utilizing various adjusting mechanisms have heretofore been utilized in vehicles such as automobiles to provide comfort for passengers riding in the seat assembly. Such seat assemblies are frequently adjustable fore and aft and up and down. Some such seat assemblies have reclinable backs and yet others utilize a headrest.

Many of the seat assemblies heretofore known utilize a separate and independent mechanism for each adjustment capability in the seat assembly. Thus, seat assemblies of the type heretofore utilized are frequently overloaded with mechanisms so as to be bulky, complex and expensive.

Accordingly, it is an object and feature of this invention to provide a novel seat assembly which is simple in construction, utilizes a minimum of components, and has a reclining back with an adjustable headrest attached thereto.

Another object and feature of this invention is to provide a novel seat assembly having a reclining back with an adjustable headrest attached thereto and an electric motor having two separate and independent clutching means for respectively determining the position of the reclining back and adjusting the headrest.

A further object and feature of this invention is to provide a motor having a clutching means on each end thereof so that rotary motion may be transmitted from either end of the motor upon actuation of the proper clutching means.

Yet another object and feature of this invention is to provide a novel clutch-drive assembly which is selectively remotely operable to produce one or more of four individual rotary movements.

Still another object and feature of this invention is to provide a novel seat assembly comprising an adjustable headrest assembly operatively connected to the seat back and including a remotely controlled actuation means for moving the headrest of the assembly relative to the back of the seat assembly.

A still further object and feature of the instant invention is to provide a novel seat assembly including an electrically actuatable clutching means attached to an electric motor and operatively interconnected with an actuation means for moving the headrest.

A still further object and feature of the instant invention is to provide a novel seat assembly including a seat frame with a back frame operatively connected to the seat frame for pivotal movement relative thereto and novel power actuated positioning means operatively interconnecting the back frame and the seat frame for pivoting the back frame between an upright position and various reclined positions.

In general, these and other objects and features may be attained in a seat assembly wherein there is included a seat frame, an intermediate frame pivotally connected to the seat frame, and a back frame operatively connected to the intermediate frame for pivotal movement relative thereto. A positioning means operatively interconnects the back frame and the intermediate frame for pivoting the back frame between an upright position and various reclined positions. An adjustable headrest assembly comprising a headrest and an actuation means is included for moving the headrest relative to the back frame. There is also included a motor means which is selectively operable for producing rotary movement and includes a clutching means attached to each respective end of the motor means for selectively transmitting rotary movement from each respective end of the motor means. A first motion transmitting means operatively interconnects one of the clutching means and the positioning means and the second motion transmitting means operatively interconnects the other clutching means and the actuation means. The positioning means includes a female means operatively connected to the seat back frame and a male means operatively connected to the intermediate frame for coacting with the female means. A first spur gear is secured to either the male means or the female means and a first worm gear rotates the first spur gear. Each of the clutching means includes a substantially doughnut-shaped solenoid winding with a driven member made of plastic rotatably disposed within the winding and a driving member made of plastic disposed on a non-magnetic drive shaft extending from one end of the motor meas for slidable movement along the drive shaft to engage the driven member. A disc member is operatively connected to the driving member for moving the driving member into engagement with the driven member in response to the magnetic field produced by the winding. The first motion transmitting means includes a first flexible shaft secured at one end thereof to the first worm gear and secured at the other end to the driven member of one of the clutching means with a first flexible conduit surrounding the flexible shaft. The actuation means of the seat assembly includes a pair of spaced bars secured to the headrest and slidably disposed in the back frame and a pair of spaced wheels each having a friction surface and secured to a rod which is rotatably supported in brackets extending from the back frame. Each wheel engages one of the bars so that upon rotation of the wheels, the bars move relative to the back frame, thus moving the headrest relative to the back frame. A second spur gear is attached to the rod and a second worm gear rotates the second spur gear. The second motion transmitting means includes a second flexible shaft secured at one end to the second worm gear and at the other end to the driven member of the other clutching means with a second flexible conduit surrounding the second flexible shaft. Thus, when the motor is rotating, one of the clutching means may be operated to position the back frame and the other clutching means may be operated to move the headrest relative to the back frame.

Other objects and attendant advantages of this invention will be readily appreciated as the same become better understood by reference to the following detailed description when considered in connection with the accompanying drawings wherein:

FIGURE 1 is a front elevational view of a preferred embodiment of the seat assembly of the instant invention and shows the headrest in a raised position in phantom;

FIGURE 2 also shows the headrest in a raised position in phantom and is a cross-sectional view partially broken away taken substantially along line 2—2 of FIGURE 1;

FIGURE 5 is an enlarged fragmentary view partially broken away of one of the brackets in the headrest assembly and is taken substantially along line 5—5 of FIGURE 2;

FIGURE 6 is a fragmentary cross-sectional view partially broken away and taken substantially along line 6—6 of FIGURE 5;

FIGURE 7 is a fragmentary cross-sectional view taken substantially along line 7—7 of FIGURE 5;

FIGURE 8 is an enlarged fragmentary view partially broken away of the other bracket of the headrest assembly;

FIGURE 9 is a cross-sectional view taken substantially along line 9—9 of FIGURE 8;

FIGURE 12 is a fragmentary side view partially cutaway and in cross section of the clutch-drive assembly utilized in the seat assembly of the instant invention;

FIGURE 13 is a cross-sectional view taken substantially along line 13—13 of FIGURE 12;

FIGURE 14 is a fragmentary cross-sectional view taken substantially along line 14—14 of FIGURE 12;

FIGURE 15 is a fragmentary cross-sectional view taken substantially along line 15—15 of FIGURE 12;

FIGURE 16 is a fragmentary cross-sectional view taken substantially along line 16—16 of FIGURE 12;

FIGURE 19 is a front elevational view of another preferred embodiment of the seat assembly of the instant invention; and FIGURE 20 is a front elevational view partially broken away of another preferred embodiment of the instant invention.

Figure 3:
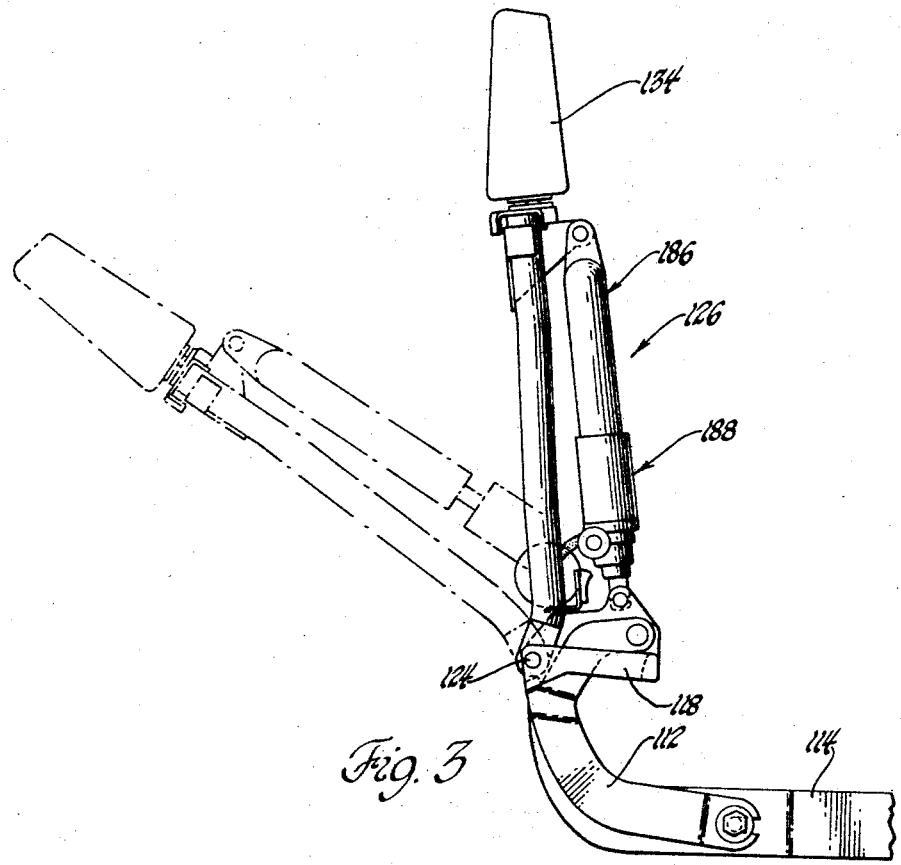
FIGURE 3 is a side elevational view of the preferred embodiment of the invention illustrated in FIGURE 1 with a phantom showing of the back frame in a reclined position.

Referring now to the drawings, wherein like numerals indicate like or corresponding parts throughout the several views, a preferred embodiment of the seat assembly of the instant invention is generally shown at 110. The seat assembly includes a seat frame, comprising the members 112 and 114 which are secured together by the bolts 116, an intermediate frame 118, and a back frame 120. The intermediate frame 118 comprises two members which may or may not be interconnected. Each intermediate frame member 118 is pivotally connected to the seat frame by a pin 122. The back frame 120 is operatively connected to the seat frame by being pivotally connected to the intermediate frame 118 by the pins 124, whereby the back frame 120 may pivot relative to the intermediate frame 118 and relative to the seat frame. The seat assembly 110 also includes a positioning means, generally shown at 126, and which operatively interconnects the back frame 120 and the intermediate frame 118 for pivoting the back frame 120 between an upright position, as indicated in solid lines in FIGURE 3, and various reclined positions, one of which is shown in phantom in FIGURE 3. The seat assembly further includes an adjustable headrest assembly, generally shown at 128, a clutch-drive assembly, generally shown at 10, a first motion transmitting means, generally shown at 130, and a second motion transmitting means, generally shown at 132.

The clutch-drive assembly 10 is most clearly illustrated in FIGURES 12 through 16 and includes a motor means, generally shown at 12, and respective clutching means disposed at each end of the motor means 12 and each generally shown at 14.

The motor means 12 is selectively operable to a first mode and to a second mode respectively for producing rotary movement in one direction when in the first mode and for producing rotary movement in the opposite direction when in the second mode. The motor means 12 comprises a reversible electric motor enclosed in the housing 16 which has a first end 18 and a second end 20. A drive shaft 22 extends from each of the ends 18 and 20 respectively of the housing 16. It is also possible to utilize a separate shaft extending from each end of the housing 16. The drive shaft 22 is preferably nonmagnetic or is made of non-magnetic material along the portion thereof which extends from the adjacent end of the housing 16.

A cap 24 is disposed on each respective end 18 and 20 of the housing 16 by a plurality of bolts 26 extending through the caps 24 and the housing 16 to secure each of the caps 24 to the respective ends 18 and 20 of the housing 16.

Each of the clutching means 14 includes a magnetic means, generally shown at 28, selectively operable for providing a magnetic field, an output means, generally shown at 30, for receiving and transmitting rotary movement, and driving means, generally shown at 32, rotated by the motor in the housing 16 and movable in response to the magnetic field to engage the output means 20 for transmitting rotary movement.

The magnetic means 28 includes a doughnut-shaped solenoid winding 34 which has a first side 36 in spaced relation to the adjacent end of the housing 16, a second side 38, an outer circumference 40 disposed adjacent the cap 24, and an inner circumference defining a hole 42 therethrough. A non-metallic covering 44 is disposed between the cap 24 and the winding 34 about the outer circumference 40 and along the second side 38 and extends into the hole 42.

The output means 30 includes a tubular bushing 46 disposed within the hole 42 and circumferentially engaging the covering 44 and in abutting relation at a first end 48 with the cap 24. Also included in the output means 30 is a driven member 50, preferably of plastic material. The driven member 50 is rotatably disposed in the bushing 46 with one end 52 disposed adjacent the cap 24. The driven member 50 has a plurality of teeth 54 extending axially from the other end thereof and includes a radial flange 56 which extends thereabout for abutting the second end 58 of the bushing 46.

Figure 4:
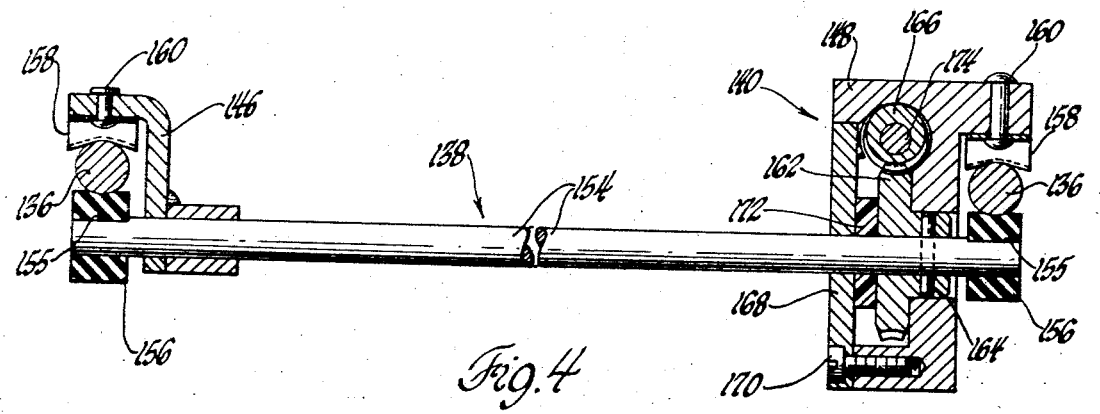
FIGURE 4 is an enlarged cross-sectional view taken substantially along line 4—4 of FIGURE 1.

Flexible shaft casings 60 and 60′ are attached to the exterior of each cap 24 by the externally threaded members 62 which threadedly engage the respective caps 24 to bind the casings 60 and 60′ therebetween. Flexible driven shafts 64 and 64′ extend through the respective caps 24 so that they may rotate relative thereto and are rotatably disposed in the respective casings 60 and 60′. Each flexible driven shaft is operatively connected to a driven member 50 by a polygonal-shaped end portion thereof which is inserted into a matching polygonal-shaped hole in the driven member 50, as is more clearly illustrated in FIGURE 4.

The driving means 32 includes a movable magnet responsive means for engaging and rotating the driven member 50 in response to the magnetic field produced by the winding 34. The movable magnet responsive means includes a driving member 70, preferably of plastic material and disposed on the non-magnetic drive shaft 22 for rotation therewith and slidable movement therealong to engage the driven member 50. The shaft 22 has a particular polygonal shape for engaging a hole of matching polygonal shape within the driving member 70, as is more clearly illustrated in FIGURE 2. It is evident, however, that a key and slot arrangement, as well as other arrangements, may be utilized to secure the driving member 70 on the shaft 22 so that the shaft 22 rotates the driving member 70 yet the driving member 70 is allowed to slide along the shaft 22. The magnetic responsive means also includes a disc member 72 which is operatively connected to the driving member 70 for allowing rotation of the driving member 70 relative thereto and for moving the driving member 70 along the drive shaft 22 in response to the magnetic field produced by the winding 34. That is to say, the disc 72 is the element which responds to the magnetic field produced by the winding 34. The driving member 70 has a plurality of teeth 74 extending from the first end thereof for engaging the teeth 54 of the driving member 50. The driving member 70 has a reduced portion 76 extending thereabout adjacent the second end thereof to form an abutment 78. The disc member 72 is disposed about the reduced portion 76 and is in abutting relation with the abutment 78. The driving member 70 rotates within and relative to the disc 72. A friction ring means 80 engages the reduced portion 76 of the driving member 70 and engages the disc member 72 to retain the disc member 72 against the abutment 78 to prevent relative axial movement between the disc member 72 and the driving member 70 while allowing the driving member 70 to rotate relative to the disc member 72. The disc member 72 has cut-away portions 82 therein for allowing the bolts 26 to pass therethrough so that the disc member 72 may move axially along the bolts but is prevented from rotating.

The driving means 32 also includes the biasing means, generally shown at 84, which includes pins 86 each disposed in the cap 24 at one end and abuts the end of the housing 16 at the other end. Each pin 86 extends through the disc member 72 and a spring 88 is disposed thereabout between the cap 24 and the disc member 72 to urge the disc member 72 toward the adjacent end of the motor 12. When the solenoid winding 34 is energized, a magnetic field therefrom will move the disc member 72 against the springs 88 and away from the end of the motor 12 to engage the teeth 74 on the driving member 70 with the teeth member 54 on the driven member 50 to rotate the driven member 50 upon rotation of the non-magnetic drive shaft 22.

The adjustable headrest assembly 128 includes a headrest 134 and an actuation means for moving the headrest 134 relative to the back frame 120. The actuation means includes a support means comprising a pair of spaced curved bars 136, a wheel means, generally indicated at 138, and a first rotation means, generally indicated at 140.

The support means comprising the pair of spaced cured bars 136 is secured to the headrest 134 and is operatively connected to the back frame 120 for allowing the headrest 134 to move relative to the back frame 120. The bars 136 are slidably disposed in the back frame 120 and have a flange 142 attached thereto for abutting engagement with the circular member 144 secured to the back frame 120. The bars 136 may be separate or may be an integrally formed U-shaped member as illustrated. The bars 136 are curved so as to move the headrest 134 in an arc relative to the back frame 120.

The wheel means 136 engages and moves the bars 136 of the support means and includes first and second spaced brackets 146 and 148 respectively. The brackets 146 and 148 are rotatably attached to the back frame 120 by the pins 150 and 152 respectively. The wheel means 138 also includes a rod 154 with a pair of wheels 156 secured by mating flat portions 155 to each end thereof. The rod 154 is rotatably supported in each of the brackets 146 and 148. Each wheel 156 has a friction surface thereabout and is secured to the rod 154 adjacent one of the brackets 146 or 148. To provide a friction surface on the wheels 156, they are preferably made of hard rubber, or the like, or have an outer surface of plastic, or the like. The wheel means 138 also includes a biasing means attached to each of the brackets 146 and 148 for urging each of the bars 136 against one of the wheels 156. More specifically, the biasing means includes a leaf spring 158 secured to the respective brackets by rivets 160, or the like. The set screws 161 and 163 respectively threadedly coact with the respective brackets 146 and 148 to engage the respective leaf springs 158 to adjust the pressure of the respective springs 158 exerted against the respective bars 136.

The rotation means 140 is operatively disposed within the bracket 148, the bracket 148 being in effect a housing, and includes a first spur gear 162 secured to the rod 154 by the pin 164, and a first worm gear 166 rotatably supported by the bracket 148 for coacting with and rotating the first spur gear 162. The bracket 148 includes a plate 168, which is held in place by the bolts 170, and a resilient bearing member 172 disposed between the plate 168 and the spur gear 162. The worm gear 166 is secured to a member 174 by the pin 176, and the member 174 is rotatably disposed in the bearing members 178 and 180.

The first motion transmitting means 130 operatively interconnects one of the clutching means 14 and the actuation means 138 for transmitting rotary movement to the actuating means 138 from the motor means 12 to move the headrest 134 relative to the back frame 120. The first motion transmitting means 130 includes the flexible shaft 64' and the flexible casing 60'. The flexible shaft 64' is secured at one end to the worm gear 166 by being secured to the member 174 by a press fit, molding, welding, brazing, or the like. The flexible shaft 64' is secured at the other end to the driven member 50 of one of the clutching means 14. The flexible conduit 60' surrounds the flexible shaft 64' and is connected at one end to the bracket 148 by the threaded nut 182 which clamps the conduit 60' between the nut 182 and the washer 184, the washer 184 being in abutting engagement with the bearing member 180. The flexible conduit 60' is secured at the other end to one of the caps 24 of one of the clutching means 14, as hereinbefore described.

The positioning means 126 illustrated in FIGURES 1 through 3 and 10 and 11 includes a female means, generally indicated at 186, a rotatable male means, generally indicated at 188, and a second rotation means, generally shown at 190.

The female means 186 is operatively connected to the back frame 120 by the pin 192 and includes a tubular member 194 and an internally threaded nut 196 secured in one end thereof. The nut 196 may be secured in the tubular member 194 by welding, brazing, press fit, slot-groove arrangement or in any other appropriate manner.

Figure 10:
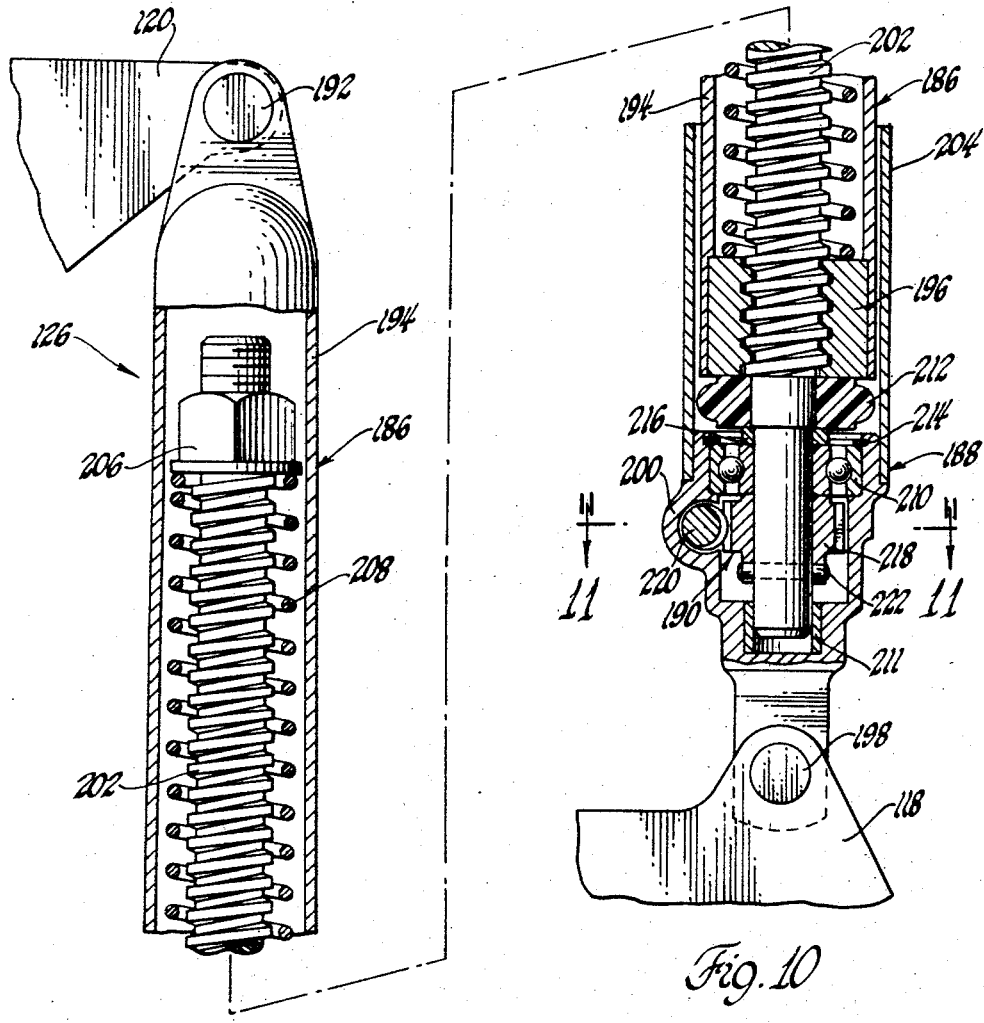
FIGURE 10 is an enlarged cross-sectional view of a preferred embodiment of the positioning means for reclining the back frame of the seat assembly.
Figure 11:
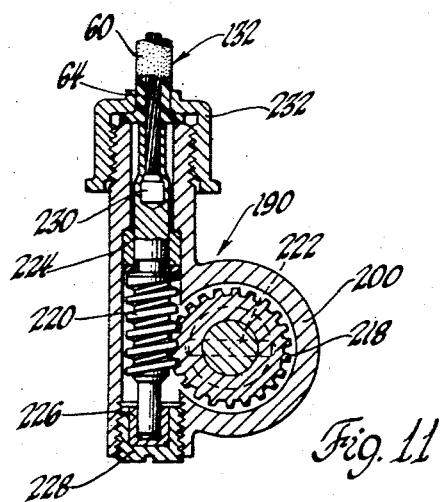
FIGURE 11 is a cross-sectional view taken substantially along line 11—11 of FIGURE 10.

The male means 188 is operatively connected to the intermediate frame 118 by the pin 198 and coacts with the female means 186. More specifically, the male means 188 includes a casing 200, an externally threaded member 202, a sleeve 204, a fastening means 206, a spring biasing means 208, bearings 210 and 211, and a resilient spacer 212. The externally threaded member 202 threadedly engages the nut 196 and is rotatably disposed in the casing 200 at a first end thereof by way of the bearings 210 and 211. The sleeve 204 extends from the casing 200 so that the tubular member 194 may telescope thereinto. The sleeve 204 may be secured to the casing 200 by welding, brazing, a press fit, or in any other appropriate manner. The fastening means 206 comprises a nut and a washer disposed on the second end of the threaded member 202, and the spring biasing means 208 is disposed between the fastening means 206 and the nut 196 to urge the tubular member 194 toward the casing 200 and into the sleeve 204. The bearing 210 is disposed in the casing 200 for rotatably supporting the threaded member 202 and is retained therein by the clips 214 and 216. The resilient spacer 212 is disposed about the threaded member 202 adjacent the casing 200 and within the sleeve 204 for abutting the nut 196 to act as a cushion and to limit movement of the nut 196 as illustrated in FIGURE 10.

The second rotation means 190 rotates the threaded member 202 and includes a second spur gear 218 and a second worm gear 220. The spur gear 218 is secured to the threaded member 202 by the pin 222 and is disposed in the casing 200. The worm gear 220 is rotatably disposed in the casing 200 for rotating the spur gear 218 which in turn rotates the threaded member 202. The worm gear 220 is rotatably disposed in the casing 200 by the bearing elements 224 and 226, the bearing element 226 being disposed in the threaded cap 228.

The second motion transmitting means 132 operatively interconnects the other clutching means 14 and the positioning means 126 for transmitting rotary movement to the positioning means 126 from the motor means 12 to pivot the back frame 120. The second motion transmitting means 132 includes the flexible shaft 64 and the flexible conduit 60. The flexible shaft 64 is secured at one end 230 thereof to the worm gear 220 by welding, brazing, a press fit, or in any other appropriate manner, and is secured at the other end thereof to a driven member 50 of the other clutching means 14, as hereinbefore described. The flexible conduit 60 surrounds the flexible shaft 64 and is connected at one end to the casing 200 by the threaded cup 232, which clamps the casing 60 between the cup 232 and the casing 200. The flexible conduit 60 is secured at the other end to the cap 24 of the other clutching means 14, as hereinbefore described.

Figure 17:
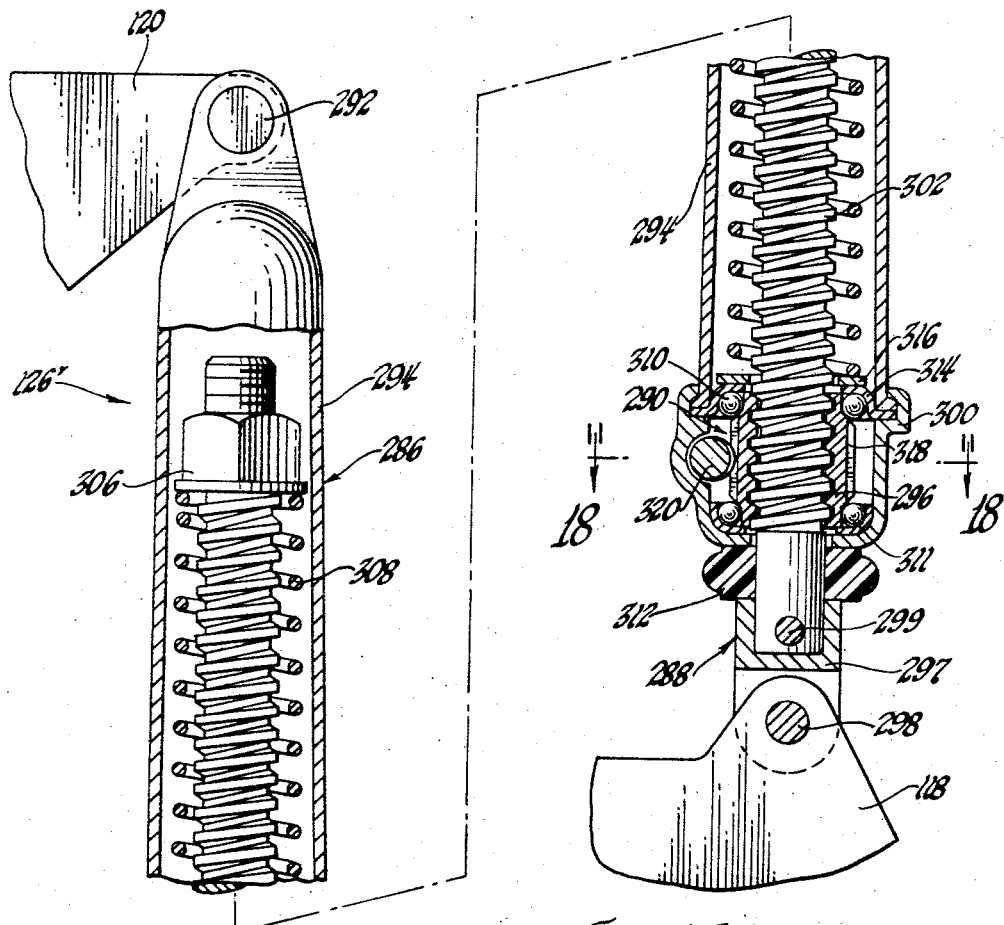
FIGURE 17 is an enlarged cross-sectional view of another preferred embodiment of the positioning means for reclining the back frame of the seat assembly.
Figure 18:
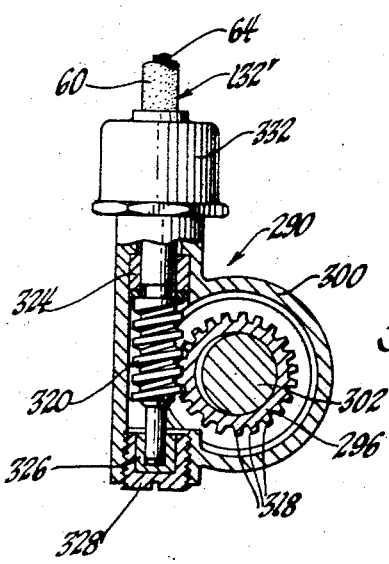
FIGURE 18 is a cross-sectional view taken substantially along line 18—18 of FIGURE 17.

Referring now to FIGURES 17 and 18, there is disclosed an alternative embodiment of the positioning means, which is generally indicated at 126'. The positioning means 126' includes a female means, generally indicated at 286, a male means, generally indicated at 288, and a rotation means, generally shown at 290.

The female means 286 is operatively connected to the back frame 120 by the pin 292 and includes a tubular member 294 and an internally threaded nut 296 which is disposed in the casing 300. The nut 296 has gear teeth 318 disposed circumferentially thereabout. The casing 300 is secured to the tubular member 294 by swaging, press fit, welding, brazing, or in any other appropriate manner. Bearing means including the bearings 310 and 311 are disposed between the casing 300 and the nut 296 for rotatably supporting the nut 296 in the casing 300. The bearing 310 has one race formed on the nut 296 and the other race formed by the clip 314. A washer 316 bears against the clip 314. The male means 288 includes an externally threaded member 302 which is operatively connected to the intermediate frame 118 by the pin 298. The threaded member 302 includes the member 297 and is secured thereto by a pin 299. However, it will be apparent to those skilled in the art that the member 297 may be integral with threaded member 302. Fastening means 306 including a nut and washer are disposed on the end of the threaded member 302 and spring biasing means comprising the spring 308 is disposed between the fastening means 306 and the nut 296 by engaging the washer 316 to urge the threaded member 302 into the tubular member 294. A resilient spacer 312 is disposed about the threaded member 302 for abutting the casing 300 to act as a cushion and to limit movement of the nut 296, as illustrated in FIGURE 17.

The rotation means 290 rotates the female means 286 and includes a worm gear 320 rotatably disposed in the casing 300 for coacting with the gear teeth 318 disposed circumferentially about the nut 297 to rotate the nut 297. The worm gear 320 is rotatably disposed in the housing 300 by the bearing elements 324 and 326, the bearing element 326 being disposed in the threaded cap 328.

A motion transmitting means 132' operatively interconnects one of the clutching means 14 and the positioning means 126' for transmitting rotary movement to the positioning means 126' from the motor means 12 to pivot the back frame 120. The motion transmitting means 132', like motion transmitting means 132, includes the flexible shaft 64 and a flexible conduit 60. The flexible shaft 64 is secured at one end thereof to the worm gear 320 and is secured at the other end thereof to a driven member 50 of one of the clutching means 14, as hereinbefore described. The flexible conduit 60 surrounds the flexible shaft 64 and is connected at one end to the casing 300 by the threaded cup 332, which clamps the casing 60 between the cup 332 and the casing 300. The flexible conduit 60 is secured at the other end to the cap 24 of one of the clutching means 14, as hereinbefore described.

As will be evident to those of ordinary skill in the art, the positioning means 126' illustrated in FIGURES 17 and 18 may be utilized in the seat assembly in place of the positioning means 126 illustrated in FIGURES 1, 2, 10 and 11. A significant advantage of the positioning means 126' is that the flexible shaft 64 and conduit 60 is attached to the female means 286 of the positioning means 126' so that upon pivotal movement of the back frame 120 the motion transmitting means 132' need not flex to the degree necessary in the case of the positioning means 126 when the motor is attached to the back frame, as illustrated in FIGURES 1 and 2. Conversely, the positioning means 126 is advantageously utilized when the motor means is attached to the seat frame since the motion transmitting means 132 is attached to the male means 188 and thus requires less flexing as the back frame is moved to a reclined position.

Referring now to FIGURE 19, there is illustrated an alternative preferred embodiment wherein the seat assembly is the same as that illustrated in FIGURE 1 in that it includes the seat frame 112, an intermediate frame 118, back frame 120, headrest 124, positioning means 126 and an adjustable headrest assembly 128. Alternatively, the positioning means 126' may be utilized in place of the positioning means 126. Instead of utilizing a single electrical motor as illustrated in FIGURE 1, the embodiment of FIGURE 19 utilizes two separate motors 340 and 342 to drive the positioning means and the adjustable headrest respectively. The motor 340 is attached to the casing 200 of the positioning means 126 with the drive shaft of the motor 340 connected directly to the worm gear of the positioning means 126. The motor 342 is connected directly to the bracket 148 such that the drive shaft of the motor 342 is connected directly to the worm gear 166 of the adjustable headrest assembly. Thus, by utilizing separate motors 340 and 342 instead of the single motor of the clutch-drive assembly 10 as illustrated in FIGURES 1 and 2, two clutching means 14 and the motion transmitting means 130 and 132 are not required.

Referring now to FIGURE 20, there is illustrated a seat assembly comprising first and second back frames 341 and 343, each of which are respectively operatively connected to seat frames 344 and 346. As illustrated, each back frame 341 and 343 is operatively connected to a separate seat frame; however, each back frame 341 and 343 may be connected to a single seat frame or, alternatively, an intermediate frame structure as illustrated in FIGURES 1 and 2. A first positioning means 348 interconnects the first back frame 341 and the seat frame 344 for pivoting the back frame 340 between an upright position and various reclined positions. A second positioning means 350 operatively interconnects the second back frame 343 and the seat frame 346 for pivoting the back frame 343 between an upright position and various reclined positions. The positioning means 348 and 350 may be of the type indicated at 126 in FIGURES 10 and 11 or of the type indicated at 126' in FIGURES 17 and 18. There is also included a clutch-drive assembly, generally shown at 10', which is the same clutch-drive assembly illustrated generally at 10 in FIGURES 12 through 16. Motion transmitting means 352 and 354 respectively operatively interconnect the respective clutching means on each end of the clutch-drive assembly 10' with the respective positioning means 348 and 350 for transmitting rotary movement to the respective positioning means 348 and 350 for pivoting the respective back frames 341 and 343. The motion transmitting means 352 and 354 each comprise a flexible shaft surrounded by a conduit like the motion transmitting means 130 and 132 illustrated in FIGURE 1.

In operating the embodiment of FIGURES 1 and 2, electrical current may be supplied to rotate the electric motor of the motor means 12 in either direction and one or both of the clutching means 14 may be electrically actuated by supplying current through either or both of the windings 34 so that rotary movement may be transmitted from the motor means 12 to one of or both of the positioning means 126 and the actuation means 138 of the headrest assembly 128. Once the motor means 12 is operating, the clutching means 14 on the right as viewed in FIGURE 1 may be actuated so that rotary motion is transmitted through the motion transmitting means 130 to rotate the worm gear 166 which in turn rotates the spur gear 162 to rotate the wheels 156. As the wheels 156 rotate, they engage the bars 136 to move the bars upward or downward depending upon the direction of rotation of the wheels 156. The bars 136 are held in frictional engagement with the wheels 156 by the leaf springs 158. When it is desired to move the headrest 154 upward, the motor means 12 is energized to rotate in one direction, and when it is desired to move the headrest 134 downward, the motor means 12 is energized so as to rotate in the opposite direction.

In a similar manner, the clutching means 14 on the left as viewed in FIGURE 1 may be actuated to transmit rotary motion through the motion transmitting means 132 to rotate the worm gear 220 which in turn rotates the spur gear 218 to rotate the threaded member 202. As the threaded member 202 rotates, the nut 196 moves along the threaded member 202 which in turn causes the back frame 120 to pivot about the pin 124 relative to the intermediate frame 118. When the motor means 12 is energized to rotate in one direction, the back frame 120 will pivot to a reclined position, such as that illustrated in phantom in FIGURE 3, and when the motor means 12 is energized to rotate in the opposite direction, the back frame 120 will pivot from a reclined position to the upright position, which is shown in solid lines in FIGURE 3.

Alternatively, the clutching means 14 on the left as viewed in FIGURE 1 may be connected by motion transmitting means to the positioning means 126' which may be utilized instead of the positioning means 126. Thus, the clutching means 14 on the left as viewed in FIGURE 1 may be actuated to rotate the worm gear 320 which in turn rotates the nut 296. As the nut 296 rotates, the threaded member 302 moves out of the tubular member 294 and casing 300 to elongate the positioning means 126', which in turn causes the back frame 120 to pivot about the pin 124 relative to the intermediate frame 118.

The clutch-drive assembly 10' illustrated in FIGURE 20 is the same as the clutch-drive assembly illustrated in FIGURES 12 through 16 and includes clutching means on each end thereof respectively connected by the motion transmitting means 352 and 354 to the respective positioning means 348 and 350. The clutch-drive assembly 10' may be selectively actuated in the same manner as the clutch-drive assembly 10 to selectively and independently operate the respective positioning means 348 and 350 to position either of the back frames 241 and 343 to any one of various reclined positions.

The invention has been described in an illustrative manner and it is to be understood that the terminology which has been used is intended to be in the nature of words of description rather than of limitation.

Obviously, many modifications and variations of the present invention are possible in light of the above teachings. It is, therefore, to be understood that within the scope of the appended claims, the invention may be practiced otherwise than as specifically described.

The embodiments of the invention in which an exclusive property or privilege is claimed are defined as follows:

1. A seat assembly comprising: a seat frame; a back frame operatively connected to said seat frame for pivotal movement relative thereto; positioning means operatively interconnecting said back frame and said seat frame for pivoting said back frame between an upright position and various reclined positions; an adjustable headrest assembly operatively attached to said back frame for moving relative to said back frame; motor means selectively operable for producing rotary movement; first motion transmitting means operatively interconnecting said motor means and said adjustable headrest assembly for transmitting rotary movement to said adjustable headrest assembly from said motor means to move said assembly relatively to said back frame; and second motion transmitting means operatively interconnecting said motor means and said positioning means for transmitting rotary movement to said positioning means from said motor means to pivot said back frame; said adjustable headrest assembly includes a headrest and actuation means for moving said headrest relative to said back frame, said actuation means includes support means secured to said headrest and operatively connected to said back frame for allowing said headrest to move relative to said back frame, wheel means for engaging and moving said support means, and rotation means operatively connecting said wheel means to said first motion transmitting means for rotating said wheel means in either direction to move said headrest in one of two opposite directions relative to said back frame.

2. A seat assembly as set forth in claim 1 wherein said positioning means includes female means operatively connected to one of said back frame and said seat frame, male means operatively connected to the other of said back frame and said seat frame for coacting with said female means, and rotation means operatively connected to said second motion transmitting means for rotating one of said male means and said female means.

3. A seat assembly comprising; a frame, an adjustable headrest assembly operatively connected to said frame and including a headrest and power actuated means for moving said headrest relative to said frame, said actuation means includes a support secured to said headrest and operatively connected to said frame for allowing said headrest to move relative to said frame, wheel means for engaging and moving the support, rotation means operatively connected to said wheel means for rotating said wheel to move the headrest relative to the frame, motor means selectively operable to a first mode and to a second mode respectively for producing rotary movement in one direction when in said first mode and for producing rotary movement in the opposite direction when in said second mode, and motion-transmitting means operatively interconnecting said actuation means and said motor means for moving said headrest relative to said frame.

4. An assembly as set forth in claim 3 wherein said support means includes a pair of spaced bars slidably disposed in said frame, said wheel means engaging and moving said bars.

5. An assembly as set forth in claim 4 wherein said wheel means includes first and second spaced brackets attached to said frame, a rod rotatably supported in each of said brackets, and a wheel having a friction surface thereabout secured to said rod adjacent each of said brackets for engaging the adjacent one of said bars.

6. An assembly as set forth in claim 5 including biasing means attached to each of said brackets for urging each of said bars against one of said wheels.

7. An assembly as set forth in claim 6 wherein said rotation means includes a spur gear secured to said rod, and a worm gear rotatably supported by said first bracket for rotating said spur gear.

8. An assembly as set forth in claim 7 wherein said motion transmitting means includes a flexible shaft secured at one end to said worm gear and at the other end to said motor means, and a flexible conduit surrounding said flexible shaft and connected at one end to said first bracket and at the other end to said motor means.

9. An assembly as set forth in claim 8 wherein said frame comprises; a seat frame, a back frame operatively connected to said seat frame for pivotal movement relative thereto, positioning means operatively interconnecting said back frame and said seat frame for pivoting said back frame between an upright position and various reclined positions, said positioning means including, a female means operatively connected to one of said frames and male means operatively connected to the other frame for coacting with said female means, said male means including an externally threaded male member operatively connected to one of said frames, said female means including a nut threadedly engaging said male member, one of said nut and said male member having gear teeth disposed circumferentially thereabout, a worm gear coacting with said gear teeth for rotating one of said nut and said male member to pivot said back frame.

10. A seat assembly comprising; a seat frame, a back frame operatively connected to said seat frame for pivotal movement relative thereto, positioning means operatively interconnecting said back frame and said seat frame for pivoting said back frame between an upright position and various reclined positions, said positioning means including, female means operatively connected to one of said frames and male means operatively connected to the other frame for coacting with said female means, said male means including an externally threaded male member operatively connected to one of said frames, said female means including a nut threadedly engaging said male member, one of said nut and said male member having gear teeth disposed circumferentially thereabout, a worm gear coacting with said gear teeth for rotating one of said nut and said male member to pivot said back frame.

11. A seat assembly as claimed in claim 10 including fastening means disposed on one end of said male member, biasing means disposed between said fastening means and said nut to urge said male member to move axially relative to said nut.

12. A seat assembly as claimed in claim 11 including a resilient spacer disposed about said male member to act as a cushion for limiting relative movement between said nut and said male member in one direction.

13. A seat assembly as claimed in claim 12 wherein said gear teeth are disposed about a spur gear, said spur gear being secured to said male member.

14. A seat assembly as claimed in claim 13 wherein said female means includes a tubular member pivotally connected at a first end thereof to one of said frames, said nut being non-rotatably secured in the second end of said tubular member, said male means includes a casing pivotally connected to the other of said frames, said worm gear being rotatably supported in said casing.

15. A seat assembly as claimed in claim 14 including a sleeve extending from said casing so that said tubular member may telescope thereinto, a bearing disposed in said casing and rotatably supporting said threaded member, said resilient spacer being disposed adjacent said casing and within said sleeve for abutting said nut.

16. A seat assembly as claimed in claim 12 wherein said female means includes a tubular member pivotally connected at a first end thereof to one of said frames, said nut being rotatably supported in said tubular member, said gear teeth being disposed circumferentially about said nut, said worm gear being rotatably supported by said tubular member.

17. A seat assembly as claimed in claim 16 wherein said tubular member includes a casing secured to the second end thereof, said nut and said worm gear being rotatably disposed in said casing.

18. A seat assembly as claimed in claim 17 including bearing means disposed between said casing and said nut, said resilient spacer being disposed about said male member for abutting the exterior of said casing.

19. A seat assembly as set forth in claim 18 including a headrest, support means operatively connected to said back frame for allowing said headrest to move relative to said back frame, and power actuated means engaging said support means for moving said headrest.

References Cited

UNITED STATES PATENTS

| | | | |
|---|---|---|---|
| 2,629,428 | 2/1953 | Luketa | 297—330 |
| 2,655,199 | 10/1953 | Luketa | 297—330 |
| 2,684,708 | 7/1954 | Luketa | 297—330 |
| 3,027,194 | 3/1962 | Rumptz | 297—410 |
| 2,579,305 | 12/1951 | Cushman | 297—361 |
| 3,044,830 | 7/1962 | Kolle | 297—361 |
| 3,046,055 | 7/1962 | Martens | 297—361 |
| 2,184,032 | 12/1939 | Allen | 192—84 |
| 3,084,776 | 4/1963 | Rabinow | 192—84 |
| 3,327,822 | 6/1967 | Spencer | 192—84 |

JAMES T. McCALL, *Primary Examiner.*

G. O. FINCH, *Assistant Examiner.*

U.S. Cl. X.R.

297—330, 410